(12) United States Patent
Natarajan et al.

(10) Patent No.: US 7,346,058 B1
(45) Date of Patent: Mar. 18, 2008

(54) MULTIPROTOCOL ENCAPSULATION SYSTEM AND METHOD

(75) Inventors: Sriram Natarajan, Sunnyvale, CA (US); Sharat Prasad, San Jose, CA (US); Yu Deng, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1034 days.

(21) Appl. No.: 10/305,640

(22) Filed: Nov. 27, 2002

(51) Int. Cl.
*H04L 12/28* (2006.01)
(52) U.S. Cl. .................................. 370/392; 370/469
(58) Field of Classification Search ............ None
See application file for complete search history.

(56) References Cited

U.S. PATENT DOCUMENTS

| | | | |
|---|---|---|---|
| 6,529,524 B1 * | 3/2003 | Liao et al. ................ | 370/467 |
| 7,114,009 B2 * | 9/2006 | Jones et al. ................ | 709/205 |
| 7,126,952 B2 * | 10/2006 | Hooper et al. ............. | 370/401 |
| 2002/0090007 A1 | 7/2002 | Kamiya et al. ............ | 370/476 |
| 2002/0176450 A1 | 11/2002 | Kong et al. ................ | 370/539 |
| 2003/0118053 A1 * | 6/2003 | Edsall et al. .............. | 370/474 |
| 2003/0193962 A1 * | 10/2003 | Primrose et al. .......... | 370/411 |
| 2004/0005039 A1 * | 1/2004 | White et al. ............ | 379/93.01 |

* cited by examiner

*Primary Examiner*—Huy D. Vu
*Assistant Examiner*—Rhonda Murphy
(74) *Attorney, Agent, or Firm*—Cindy Kaplan (57) ABSTRACT

A multiprotocol encapsulation method and system for transporting different protocols over Ethernet are disclosed. The method includes receiving frames from an optical interface and identifying a protocol of the frame. The frames are multiprotocol and include storage network interface protocols. The frames are encapsulated into Ethernet protocol and transported over an Ethernet link.

34 Claims, 9 Drawing Sheets

| Preamble +SFD | Destination Address | Source Address | Ethernet Type/Len. | First ECH | Follow. ECH | Pay-load | Follow. ECH | Pay-load | FCS |

FIG. 3

| First Encapsulation Control Header (Order of Transmission) | | | |
|---|---|---|---|
| Field | Size (bits) | Description | |
| Encapsulated Protocol Type | 3 | x0-1x Fibre Channel x1-2x Fibre Channel x2-SONET OC-3 x3-SONET OC-12 x4-SONET OC-48 x5-SONET OC-192 x6-ESCON x7-Infiniband | 40 |
| Fibre Channel Mode bit definitions | | | |
| Operational Mode | 1 | x1=Login Mode x0=Normal Mode | |
| Under Login Mode | | | |
| H2H Credit Recovery | 1 | x1=Enabled x0=Disabled | |
| H_LOGI | 1 | x1=Yes | |
| H_LOGI_ACC | 1 | x1=Yes | |
| H_BB_SC_N | 9 | Credit Recovery number | |
| Under Normal Mode | | | |
| H_BB_SCr | 1 | x1=Yes | |
| H_BB_SCs | 1 | x1=Yes | |
| M_DELTA | 10 | Delta memory size transmitted delta resolution set during login. | |
| Other Modes bit definitions | | | |
| Sequence No. | 4 | Useful for aligning out of order frame reception. Used only for ESCON mode | |
| PT | 6 | Pause Timer. Timer resolution is provided in TCR reg. Used only for Gig flow control. Not used in FC mode | |
| Rsvd | 3 | Reserved field Value=0 | |

FIG. 4A

| Second Encapsulation Control Headers (Order of Transmission) | | |
|---|---|---|
| Field | Size (bits) | Description |
| Under Login Mode | | |
| Credit Mem Size | 20 | Available Credit Memory Size in lines |
| Rsvd | 1 | Reserved Feld Value=0 |
| Credit Mem Delta line resolution | 3 | In increments of 256 bytes |
| CRC-8 | 8 | Header CRC |
| Under Normal Mode | | |
| Valid. | 1 | x1=Frame Valid |
| Ordered Seq. | 1 | x1=Yes |
| Rsvd | 1 | Reserved Feld Value=0 |
| Length | 13 | Payload bytes |
| Last client frame | 1 | x1=Yes |
| More Frags. | 1 | For ESCON only |
| Rsvd | 6 | Reserved Feld Value=0 |
| CRC-8 | 8 | Header CRC |

MULTIPROTOCOL ENCAPSULATION SYSTEM AND METHOD

BACKGROUND OF THE INVENTION

The present invention relates generally to communication networks, and more specifically, to a multiprotocol encapsulation system and method for protocols such as Fibre Channel, ESCON, Infiniband, or SONET over Ethernet for transport applications.

Wavelength Division Multiplexing (WDM) is an optical technology that couples many wavelengths in the same fiber, thus effectively increasing the aggregate bandwidth per fiber to the sum of the bit rates of each wavelength. Dense WDM (DWDM) is a technology with a larger (denser) number of wavelengths (e.g., >=40) coupled into a fiber than WDM. Systems may support, for example, 100 wavelengths per fiber, enabling a single fiber to carry several hundred gigabits of information. DWDM increases the capacity of embedded fiber by first assigning incoming optical signals to specific frequencies within a designated frequency band and then multiplexing the resulting signals out onto one fiber. DWDM combines multiple optical signals so that they can be amplified and transported over a single fiber to increase capacity. Each signal can be at a different rate and in a different format. DWDM applications include ultra-high bandwidth long haul as well as ultra-high-speed metropolitan or inner city-networks, and at the edge of other networks such as SONET, Internet protocol (IP) and asynchronous transfer mode (ATM).

In conventional DWDM applications, many different protocols need to be aggregated into a single data channel to be transported over a wavelength. For example, a single 10 Gigabit DWDM channel can carry multiple lower-speed source application protocols such as ESCON (200 M), Fibre Channel (FC) (1.0625 G) or Gigabit Ethernet (GE) (1.25 G), and multiple channels of those protocols need to be converged to one transport interconnect signal, such as the 10 Gigabit Ethernet (IEEE 802.3.ae) or SONET (OC-48, OC-192), which are the most prominent choices for DWDM technology.

Since the DWDM protocol of either Gigabit Ethernet or SONET is different from the source application protocols, one way to converge the application protocols is to participate the protocol and terminate the application at the connecting node and regenerate the application protocol at the other end. This, however, involves complicated and expensive system designs. A more efficient method is to perform a transparent interconnect, so that the application protocol data is directly carried through Gigabit Ethernet. Conventional systems, however, do not provide for mapping of different protocols over common Ethernet transport. Conventional systems have begun to provide mapping of Ethernet, ESCON, and Fibre Channel protocols for transport over SONET. However this mapping requires a protocol such as the HDLC (High-level Data Link Control) [POS (Packet over SONET)] or the GFP (Generic Framing Procedure) for packet delineation. The HDLC packet delineation imposes a variable overhead. In the worst case, the overhead doubles the bandwidth required. The GFP packet delineation requires a complex variable length based Hunt procedure to maintain packet boundary alignment. The total overhead required to support packet delineation and multiplexing of multiple packet streams is higher than the method described here. In particular, with this added overhead, 10 Gb/s Ethernet cannot be carried in 10 Gb/s SONET (OC 192). In comparison, Ethernet employs identical packet delineation to that of ESCON and Fibre Channel that is based on explicit Start-of-Packet and End-of-Packet Link Control Characters or Words. This mapping is simple and has a fixed small overhead. The mapping permits 10 Gb/s Ethernet to be carried as a signal with its native coding.

SUMMARY OF THE INVENTION

A multiprotocol encapsulation method and system for transporting different protocols over Ethernet are disclosed. The method includes receiving frames from an optical interface and identifying a protocol of the frame. The frames are multiprotocol and include storage network interface protocols. The frames are encapsulated into Ethernet protocol and transported over an Ethernet link.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A system and method disclosed herein provide multiprotocol encapsulation for protocols such as Fibre Channel, ESCON, Infiniband (storage), or SONET (circuit) over Ethernet for transport applications. The system thus provides for multiprotocol transportation over long haul DWDM networks having an Ethernet backbone. As described below, the system provides multiprotocol transparency (e.g., frames and ordered sets are transported transparently in Fibre Channel), detection of link failures between local and remote ports, port state detection and distance extension (in the case of Fibre Channel and Infiniband).

Figure 1:
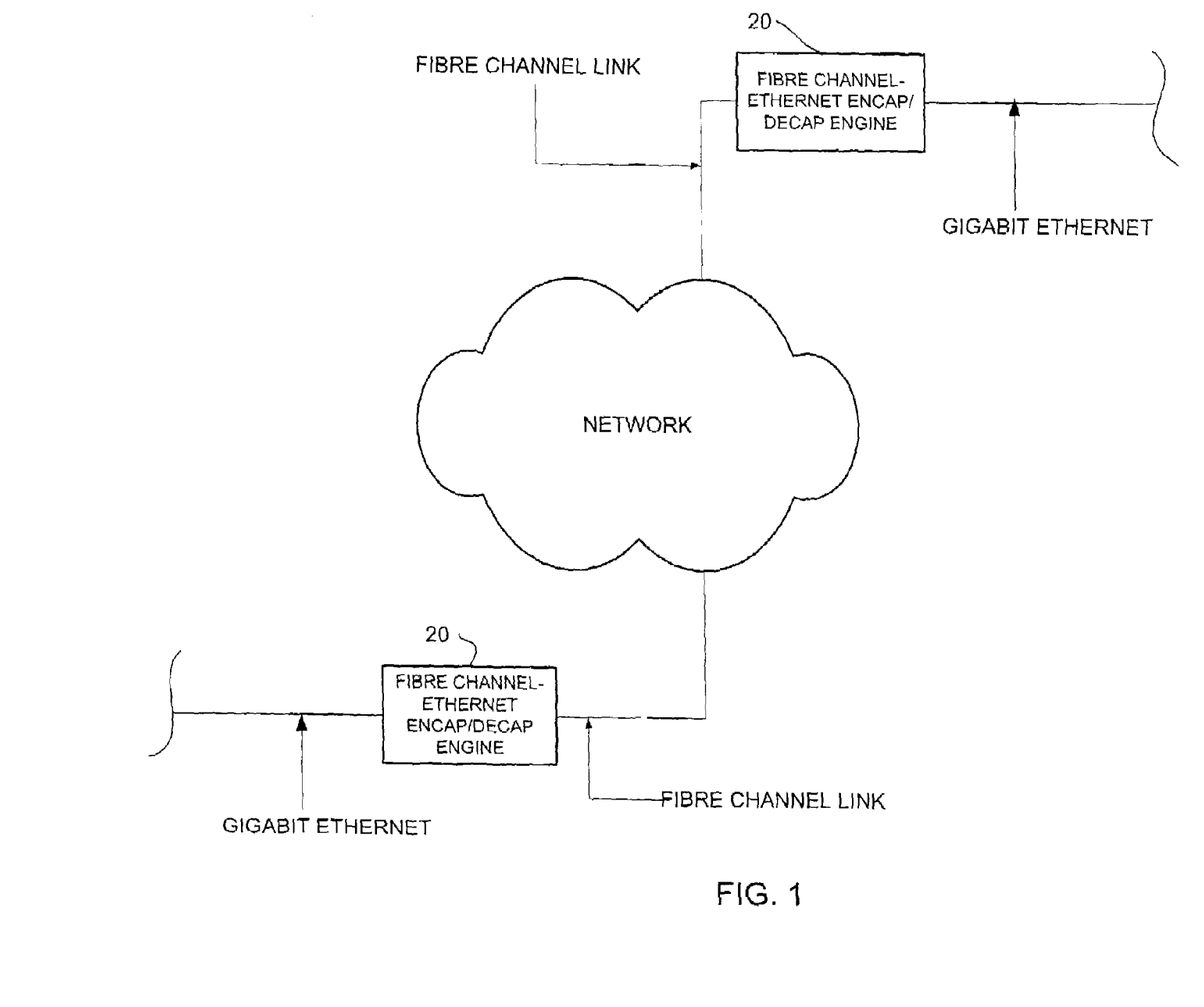
FIG. 1 is a diagram illustrating an exemplary network utilizing a system of the present invention.

The present invention operates in the context of a data communication network including multiple network elements. As shown in FIG. 1, the network may include a DWDM network connecting two Ethernet networks. A link connection may provide, for example, interconnection for Fibre Channel to Gigabit Ethernet on a user Gigabit medium independent interface. An optical transport platform such as ONS 15530, 15540, 15454, or 15600 (available from Cisco systems, Inc.) may be used at the DWDM interface. The system of the present invention may be incorporated, for example, in an FPGA (field-programmable gate array) of a linecard of the ONS.

The system includes an encapsualtion/decapsulation engine 20. This mechanism allows for fragmenting single client frames into multiple Ethernet frames and packing multiple client frames into single Ethernet frame. The method includes adding encapsulation control headers (ECH) to transport client protocols over Ethernet protocol. The protocol is mapped on Ethernet packets using encapsulation control headers on an ingress side and frames are recovered using the same control header on an egress side and transmitted.

In one embodiment, the system includes a Fibre Channel-Gigabit Ethernet encapsulation/decapsulation engine 20. The encapsulation engine 20 performs multiprotocol encapsulation on the raw Fibre Channel data. Fibre Channel payload is transmitted over the Ethernet interface (e.g., GMII interface) using a multiprotocol encapsulation mechanism. It is to be understood that the encapsulation engine 20 is configured to support multiple protocols and that the Fibre Channel link of FIG. 1 is only one protocol example.

Figure 2:
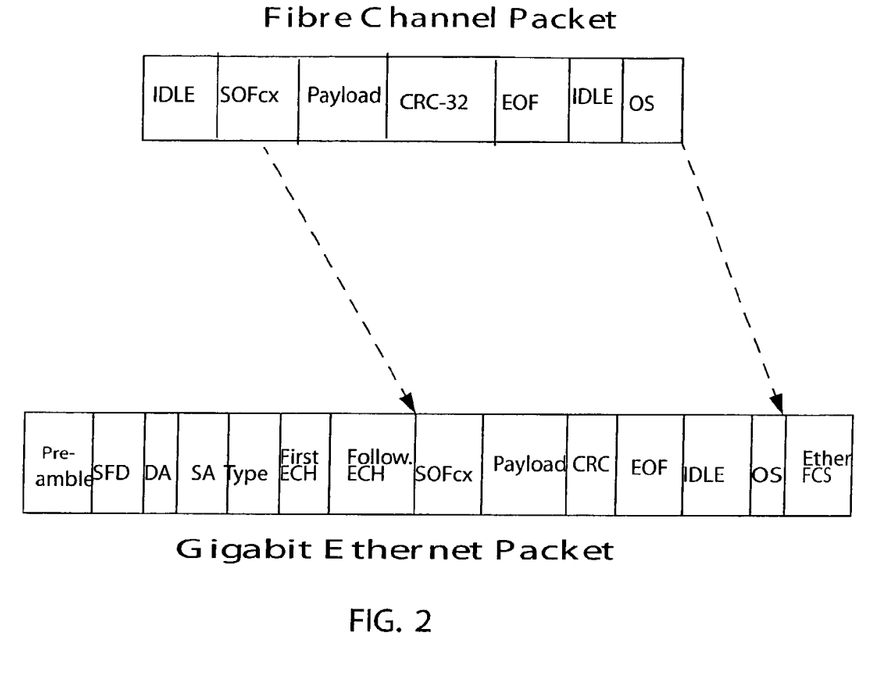
FIG. 2 illustrates mapping between a Fibre Channel packet and an Ethernet packet.

FIG. 2 illustrates a typical Fibre Channel packet and mapping of the Fibre Channel fields to the fields of a Gigabit Ethernet packet. The Fibre Channel packet includes, for example, the following fields: idle, start of field (SOF), payload, CRC (cyclic redundancy check), end of field (EOF), and ordered set (OS). The Gigabit Ethernet packet includes a preamble, start frame delimiter (SFD), destination address (DA), source address (SA), type, SOF, payload, CRC, EOF, idle, OS, and frame check sequence fields. The packet further includes an encapsulation control header (ECH) which comprises a first ECH and a second (also referred to as following or next) ECH, which are described in detail below.

Figure 3:
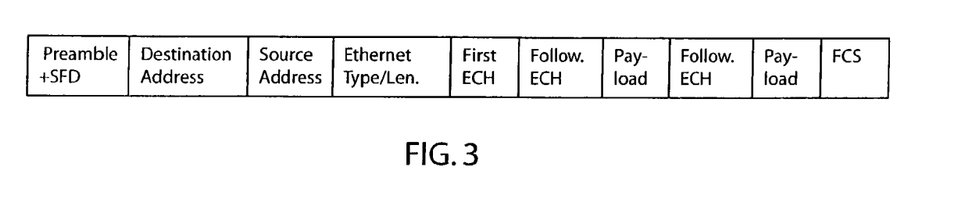
FIG. 3 illustrates an example of a multiprotocol encapsulation for the Fibre Channel packet.

FIG. 3 shows an example of multiprotocol encapsulation of Fibre Channel for transport over Gigabit Ethernet. An example of a calculation of Fibre Channel payload overhead for the packet of FIG. 3 is as follows:

Overhead=Preamble+SFD+DA+SA+Ethernet type/length+

FirstECH+FollowingECH+FCS+IPG (inter-packet gap) overhead

=8+6+6+2+5+1+4+IPG overhead

=32+IPG overhead (12 bytes for GE, 12-15 bytes for XGMII)

The minimum Fibre Channel frame length is:

IPG+SOF+Header+CRC+EOF+IPG

=3+1+6+1+1+3

=15 words

=60 bytes

The Ethernet frame length is:

Preamble+SFD+DA+SA+Type+Ethernet CRC+Ethernet IPG=

8+14+4+12

=38 bytes

The first ECH is 2 bytes and the second ECH is 4 bytes. The FC bandwidth is 1.06 Gbps and the GMII bandwidth is 1.25 Gbps. The overhead ratio is:

(1.25−1.06)/1.06=

=0.18

The Fibre Channel payload overhead factor should therefore be less than 0.18. For each byte of overhead on the header, a minimum of 5.56 (1/0.18) of Fibre Channel payload is transmitted over Gigabit Ethernet. This results in an encapsulation algorithm of:

5.56*38+5.56*(first ECH)+5.56*(second ECH)

=223+5.56*(second ECH).

Therefore, for every second (next) ECH, 22 bytes of Fibre Channel payload are preferably transmitted in addition to the 223 bytes.

As noted above, the encapsulation header includes a first encapsulation control header and a second encapsulation control header. The first encapsulation control header is 16-bit long. It is transmitted after the Ethernet type field. The header includes information on protocol type, sequence number, and pause timer values for Ethernet flow control. The first ECH also contains information regarding the protocol type being encapsulated. If the protocol is Fibre Channel, it represents either login mode operation or normal mode operation.

Figure 4A:
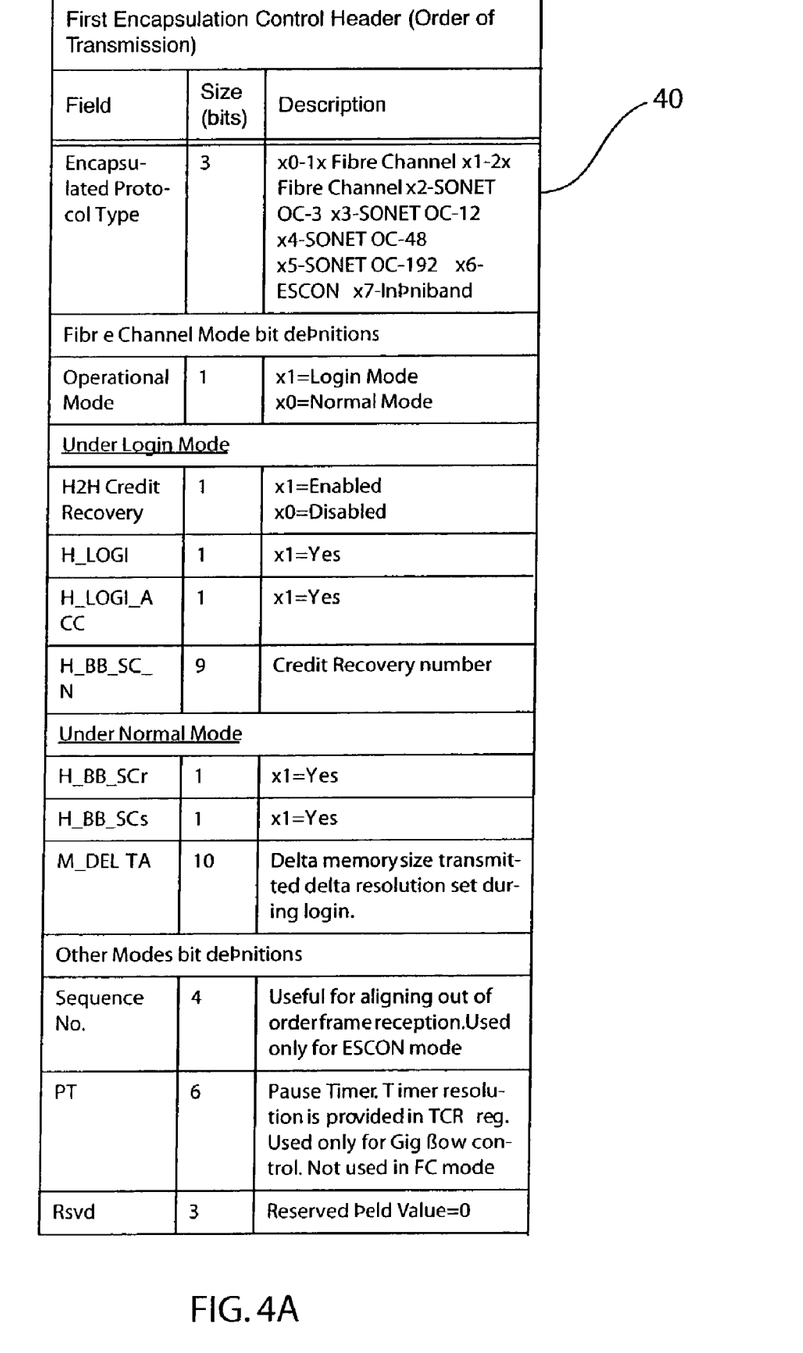
FIG. 4A is a table listing bit definitions of an exemplary first encapsulation control header.
Figure 4B:
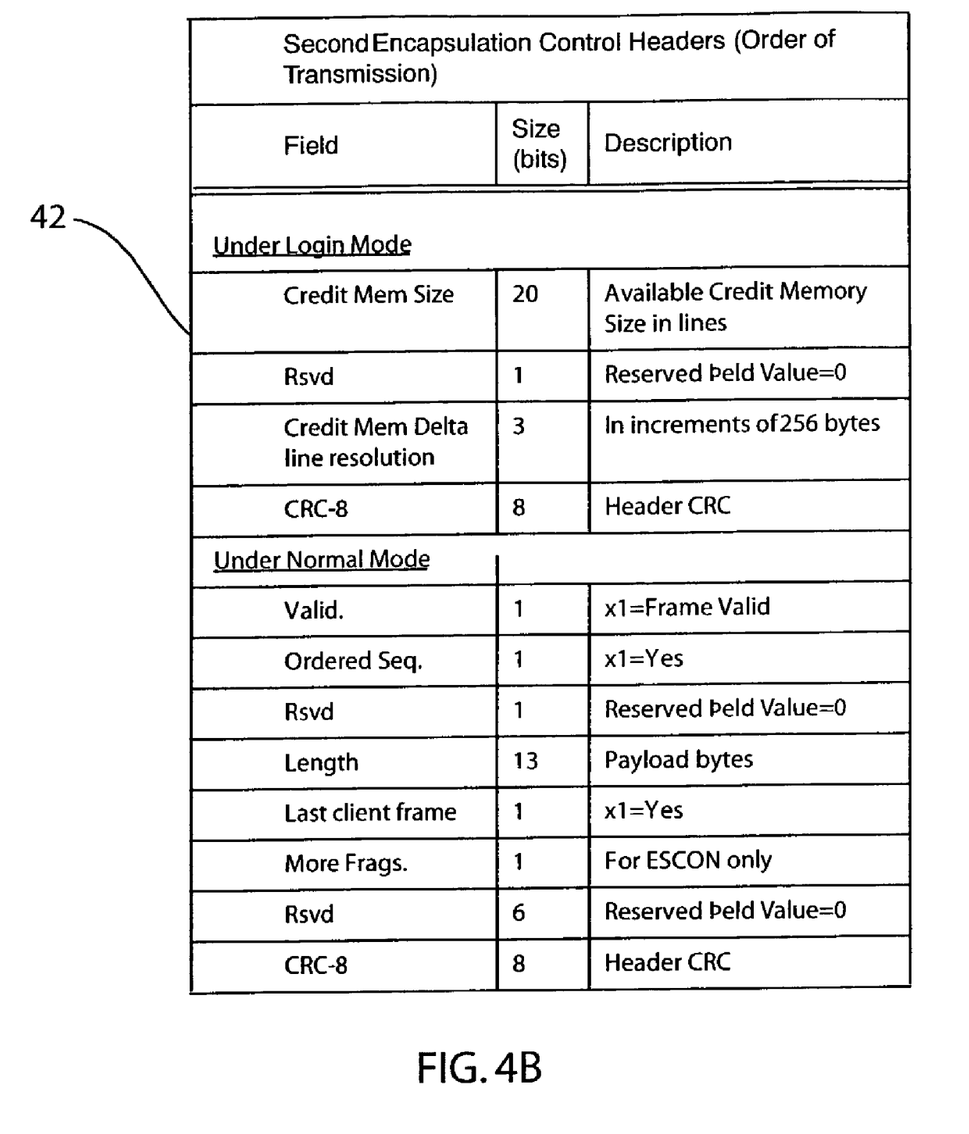
FIG. 4B is a table listing bit definitions of an exemplary second encapsulation control header.

FIGS. 4A and 4B show tables 40, 42 which list bit definitions for the first and second encapsulation control headers, respectively. Referring first to FIG. 4A, the first field of the ECH specifies the protocol type (e.g., Fibre Channel, SONET, ESCON, Infiniband). If the protocol is Fibre Channel, the header includes bits for login mode and normal mode. Login mode is used during power up to find parameters and exchange information with remote node.

Under login mode, credit recovery fields are used to recover loss of data. For example, the number of frames to reclaim in memory may be specified. The first field, H2H Credit Recovery indicates whether credit recovery is supported between two nodes (e.g., local and remote node). H_LOGI and H_LOGI_ACC are exchange parameters used top transfer data between two nodes. When a local node wants to login to a remote node, the H_LOGI bit is set. The H_LOGI_ACC is set when the remote node sends its own login parameters. H-BB-SC_N is used to exchange information identifying missing frames. For example, this field may be used to request the number of frames or ordered sets that need to be recovered.

The following fields are used under normal mode. H_BB_SCr provides information on the number of ordered sets that were sent since the previous H_BB_SCr was sent. H_BB_SCs provides information as to how many frames were sent since the last H_BB_SCs was sent. M_Delta is the delta memory size emptied from the egress credit buffer. It may be represented, for example, in terms of line resolution set during login. M_Delta is also used for flow control. The flow of frames through two Fibre Channel N_Ports is through R_RDY handshaking in case of Buffer-to-Buffer flow control or through ACK frames in case of End-to-End flow control.

In Fibre Channel, the initiating N_Port cannot send more frames once the credit count is exhausted. It needs to wait for R_RDYs to send more frames. This results in a bottleneck in high bandwidth interface where the link can be idle for most of the time. This is prevented by implementing the Flow control of Fibre Channel frames. An example of a mechanism for achieving high throughput through the link is described below with respect to FIG. 5, which illustrates a DWDM network having two encapsulation devices (e.g., chips) 44, 45, each configured for multiprotocol encapsulation. Each device 44, 45 is coupled to a frame buffer 46, 47 and a Fibre Channel port 48, 49 respectively.

Figure 5:
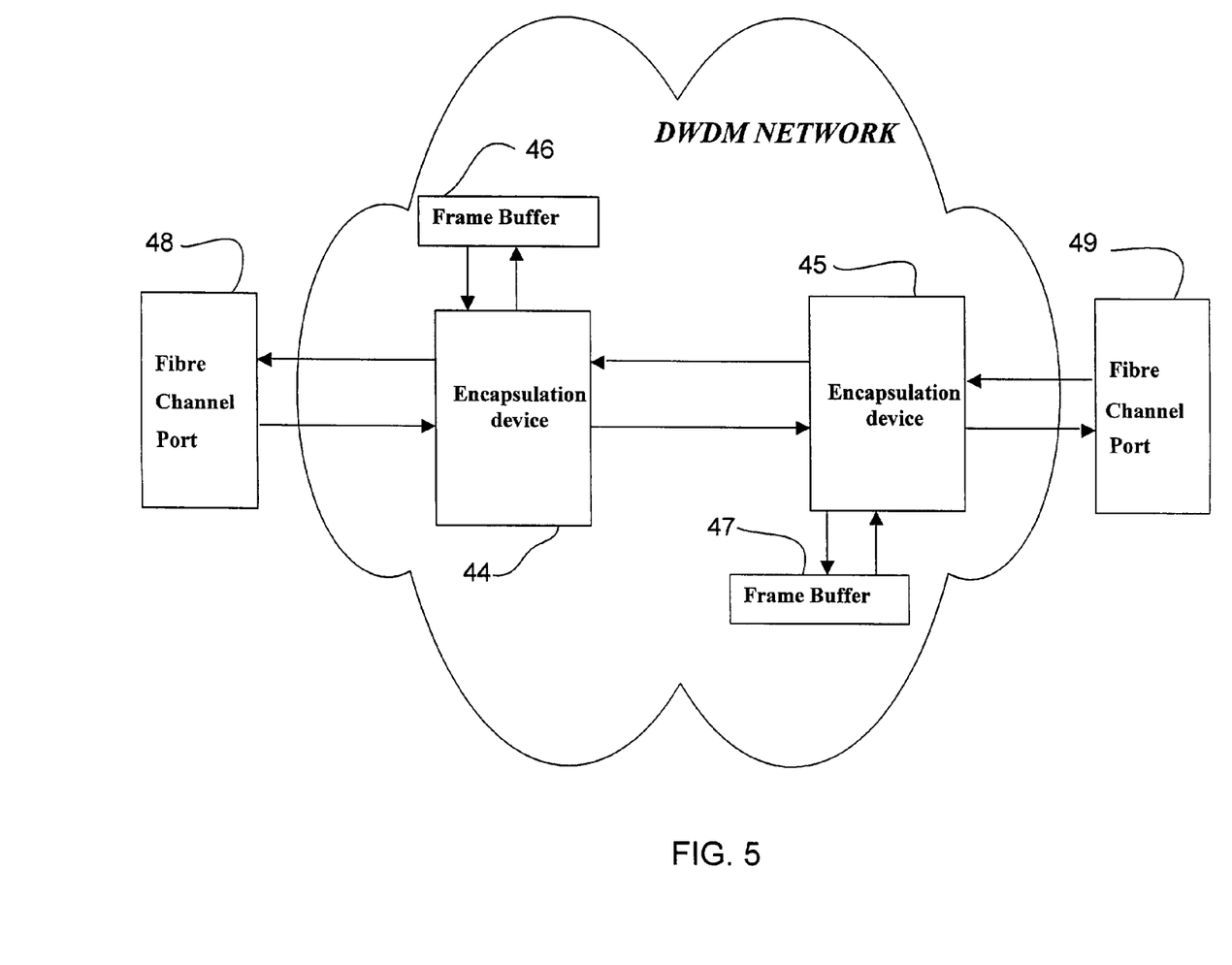
FIG. 5 is a diagram illustrating additional detail of the network of FIG. 1.

When an N_Port sends a PLOGI/FLOGI frame if initiator (or PLOGI_ACC/FLOGI_ACC if a target) or E_Port sends a ELP frame (or ELP_ACC if a target) after link recovery, encapsulation device 44, 45 captures it and generates a number of RRDYs proportional to the established login credit, available buffer memory and link distance. Credit recovery is implemented between the two encapsulation devices 44, 45 on either side of the DWDM network and also between the device and Fibre Channel, port 48, 49, respectively, attached thereto locally. Memory buffer synchronization between the two encapsulation devices 44, 45 is implemented using the encapsulation control header mechanism described herein. In case the link becomes idle, FC idles are encapsulated using the encapsulation control header.

The following describes Fibre Channel flow control over a DWDM link. In this example, Fibre Channel ports 48, 49 are true Fibre Channel ports. When Fibre Channel port 48 attempts to login to Fibre Channel port 49, it sends out a PLOGI (or FLOGI if a switch exists in between) frame with its available BB Credit. Fibre Channel port 49 responds back with its own BB credit. Encapsulation device 44 generates a number of RRDYs proportional to the login credit established by Fibre Channel port 48 and based on the amount of buffer memory on encapsulation device 45 and link distance. Since more RRDYs are generated locally towards Fibre Channel port 48, it can send out more frames which are stored in frame buffer 47. Frame buffer 47 is emptied based on the number of R_RDYs got from Fibre Channel port 49. The same process applies for data communication from Fibre Channel port 49 to Fibre Channel port 48.

By providing expediting of delivery indication (R_RDY) capability buffering on the Ingress end and buffering on Egress end, the encapsulation provides distance extension. To extend operation to longer distances, it expedites the delivery indication to the sender causing the sender to send sufficient data to keep the link full, buffers the excess data before it reaches the receiver (in the event the receiver is unable to accommodate the additional data in its limited buffer) and finally forwards it to the receiver as and when the receiver is able to receive it.

Other mode bit definitions include sequence number and pause timer (PT). The sequence number is used for detecting lost or duplicated frames. The pause timer is used for Gigabit Ethernet flow control (IEEE 802.3z).

The second encapsulation control headers are transmitted based on Fibre Channel frame reception. The encapsulation control header contains information on Fibre Channel frame length, Fibre Channel credit management information, whether or not it is ordered sequence, and representation of last client frame. The second header is also protected by an 8-bit CRC. The encapsulation header information is exchanged periodically between nodes both on ingress and egress paths. For example, if line size is chosen to be 256, when there are idles equal to 25 Max size Fibre Channel frames on the Fibre Channel line side, a payload containing Fibre Channel idles with encapsulation header is inserted.

Fields under login mode include credit memory size, line resolution, and CRC. Credit memory size is used to provide information on the available credit memory size in line resolution represented by the credit memory delta line resolution field. The credit memory delta line resolution represents the line resolution in 16 byte increments. For example, 0×0 represents 16 byte line, 0×7 represents $16 \times 2^7 = 16 \times 128 = 2048$ byte line. The line size is provided in increments of 16 bytes (i.e., 16*(2")). The CRC is preferably an 8-bit CRC.

The following fields are included under normal mode. A frame valid field indicates whether or not the contents of the encapsulated frame are valid (e.g., received Fibre Channel frame has proper SOF, EOF, and CRC). If a frame with a CRC error is encapsulated, this bit may be set to 0. An Ordered Sequence bit indicates whether the current encapsulated payload contains ordered sets before SOF. The Length field indicates the encapsulated Fibre Channel frame length. The Last Client Frame indicates that the current frame is the last Fibre Channel frame under the gigabit packet. The More Frags. field is used for ESCON encapsulation. All bits in the second encapsulation control header are preferably protected using 8-bit CRC.

Figure 6A:
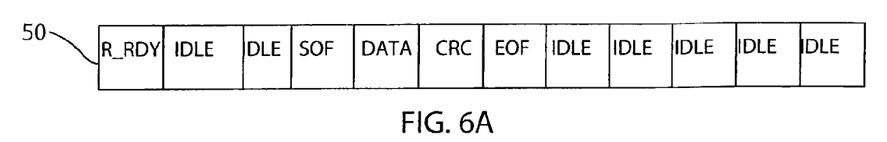
FIGS. 6A-6E illustrates encapsulation of various types of Fibre Channel packets.

FIGS. 6A-6E illustrate examples of Fibre Channel encapsulation. FIG. 6A represents an Ethernet frame having an ordered set as the first Fibre Channel payload word. The frame is encapsulated into an Ethernet frame 50 having R_RDY as first Fibre Channel payload word. The frame is packed up to the required amount of idles necessary for minimum Fibre Channel payload.

Figure 6B:
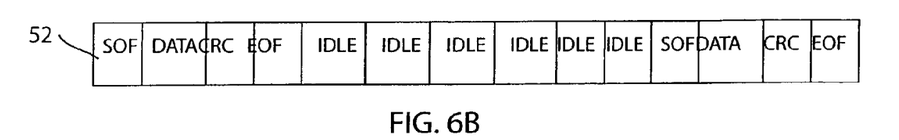

In the example of FIG. 6B, the Fibre Channel data is encapsulated into an Ethernet frame 52 having FC SOF as first Fibre Channel payload word. It is followed by FC IPG and another FC frame. In this case both FC frames are packed into single Ethernet frame, although the minimum payload requirement may be met in the middle of the second FC frame (e.g., if the first FC frame is 64 bytes long and the second FC frame is 512 bytes long).

Figure 6C:
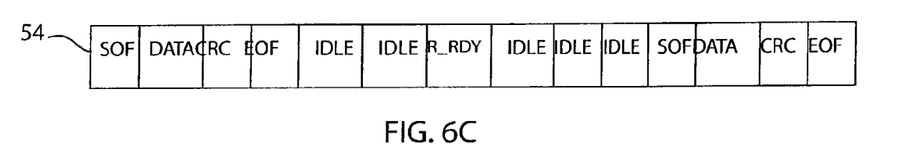

FIG. 6C represents an Ethernet frame having FC SOF as the first Fibre Channel payload word. Two back-to-back Fibre Channel frames with minimum IPG are packed into a single Ethernet frame 54.

Figure 6D:
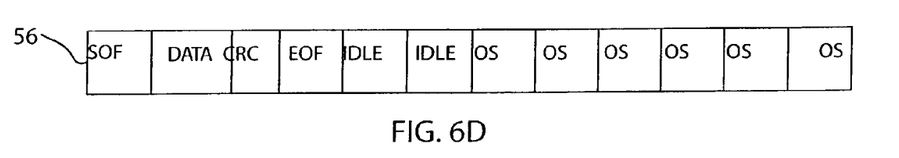

In FIG. 6D, the Ethernet frame has FC SOF as first Fibre Channel payload word. The frame is followed by ordered sets which are packed until minimum encapsulation payload requirements are met to create frame 56.

Figure 6E:
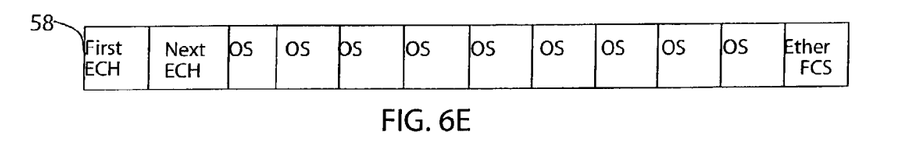

FIG. 6E represents an Ethernet frame containing only valid ordered sets. In this case all ordered sets are packed until minimum encapsulation requirements are met to create frame 58.

Figure 7A:
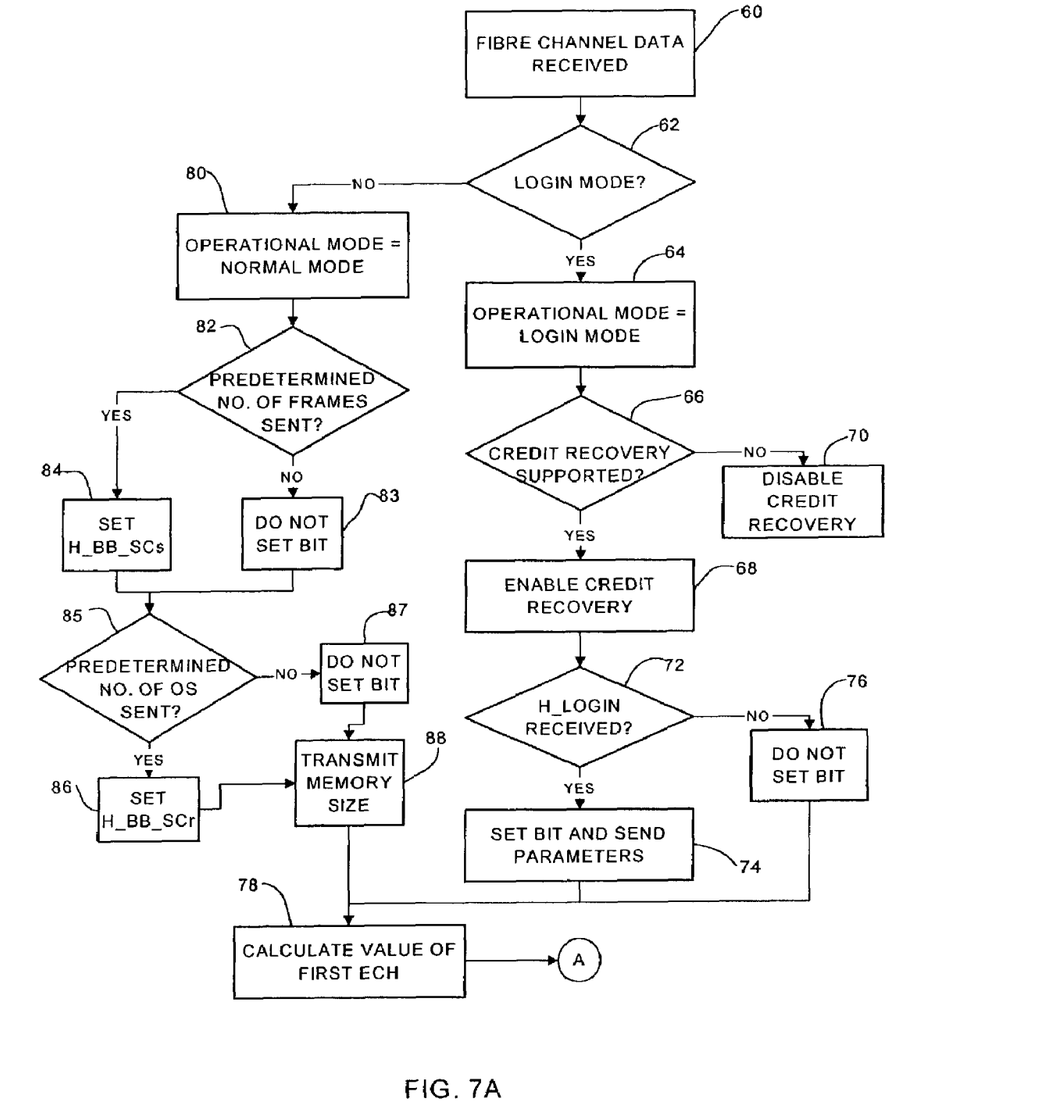
FIG. 7A is a flowchart illustrating a process for creating the first encapsulation control header.
Figure 7B:
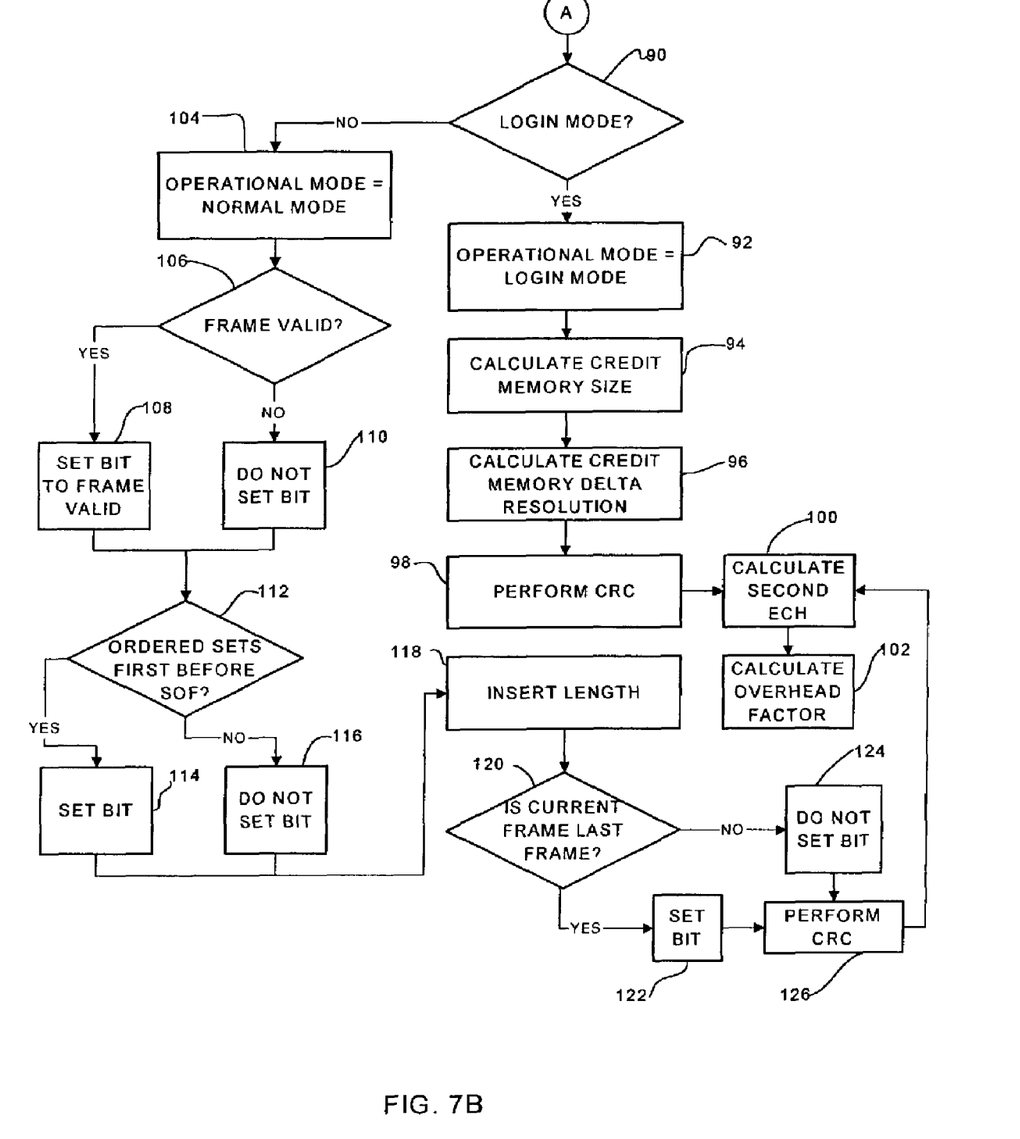
FIG. 7B is a flowchart illustrating a process for creating the second encapsulation control header.

FIGS. 7A and 7B are flowcharts illustrating multiprotocol encapsulation. FIG. 7A covers generation of the first encapsulation control header and FIG. 7B covers generation of the second (following) encapsulation control header. Fibre Channel data is received at step 60. If operational mode is login mode (steps 62 and 64) it is first determined if credit recovery is supported (step 66). If it is supported, credit recovery is enabled (step 68), otherwise it is disabled (step 70). If login parameters are received the H_LOGI bit is set (steps 72 and 74). If the H_LOGI bit is not set (step 76) then the H_LOGI_ACC bit may be set. The first ECH value is then calculated and transmitted after the Ethernet type field (step 78).

If the operational mode is normal mode (step 80), it is first determined if a predetermined numbers of frames or ordered sets were sent since the last H_BB_SCs and H_BB_SCr bits were sent (steps 82 and 85). If a predetermined number of frames were sent (since the previous H_BB_SCs) was sent, the H_BB_SCs bit is set (step 84). If a predetermined number of ordered sets were sent since the previous H_BB_SCr was sent, the H_BB_SCr is set (step 86). If the predetermined number of bits was sent not, the corresponding bits are not set (steps 83 and 87). At step 88, the delta memory size emptied from the egress credit buffer is transmitted. The value of the first ECH is then calculated at step 78.

The second (next) ECH is then generated as shown in FIG. 7B. If operational mode is login mode (steps 90 and 92), the credit memory size is calculated at step 94. The credit memory delta resolution is then calculated at step 96. CRC is performed at step 98. The second ECH value is then calculated (step 100) and the overhead factor is calculated (step 102).

If the operational mode is normal mode (steps 104 and 106). A frame check is first performed (step 106). If the frame is valid the appropriate bit is set (step 108) and if the frame is invalid the bit is not set (step 110). If the encapsulated payload contains ordered sets before the start of frame, the Ordered Seq. bit is set (step 112, 114, and 116). The encapsulated Fibre Channel length is inserted at step 118. If the current frame is the last frame the Last Client frame bit is set (steps 120, 122, 124). CRC is performed (step 126) and the second ECH is calculated (step 100) along with the overhead factor (step 102).

ESCON and Infiniband are transported in a manner analogous to that of Fiber Channel described above. Minimum encapsulated packet length is determined by bit rate and frame syntax of ESCON and Infiniband client signals.

The sequence number and more fragments fields can be used for fragmentation of Fibre Channel and ESCON. Since the payload can be a minimum of only 224 fibre channel bytes to be transported over Gigabit Ethernet, big size Fibre Channel frames can be fragmented into fragments of 224 bytes each. Since Fibre Channel is mainly used for storage, most of the real-life traffic is bound to be of the order of maximum size frames (2148 bytes in case of Fibre Channel). This improves latency across the DWDM network as well as increased throughput between the connected client ports.

The Encapsulation Control Header (ECH) information is exchanged periodically between the two encapsulation devices 44, 45 on either side of the DWDM network (FIG. 5). If there is a local client link failure, the encapsulation device associated with it generates an Offline Sequence (OLS ordered set in Fibre Channel) which in turn is carried over transparently to the remote client and the link initialization procedure between the two clients start again. In case of trunk failure the remote device senses the failure, since it times-out on no ECH received timer value as programmed by software, and sends an Offline Sequence (OLS ordered set in Fibre Channel) towards the local as well as the remote client which restarts the link again.

Figure 8:
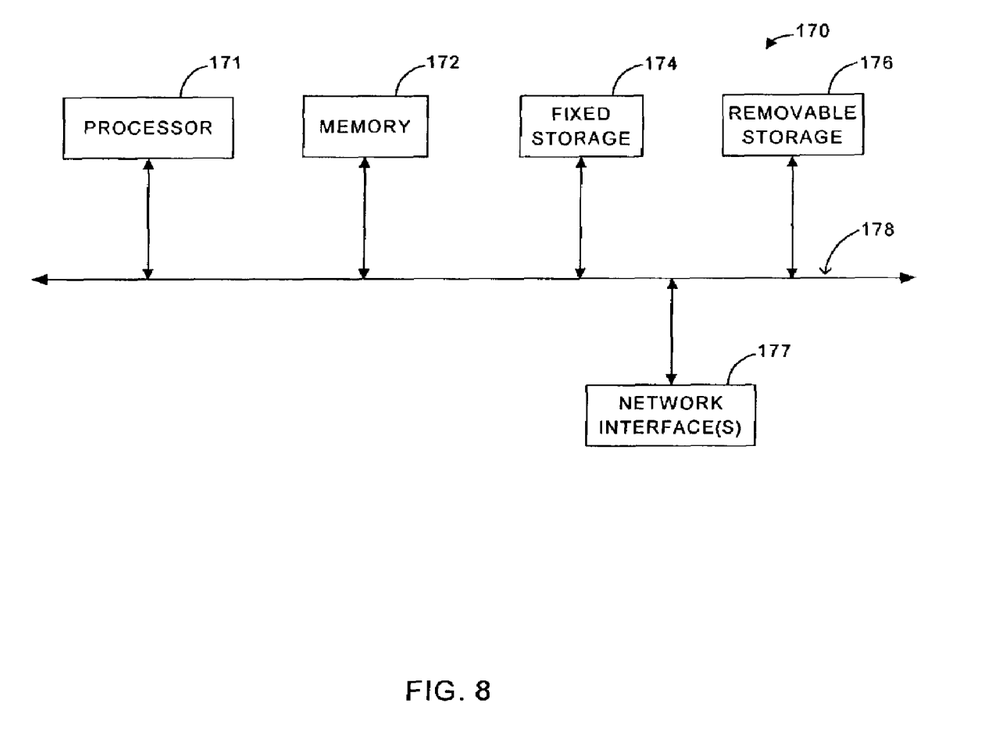
FIG. 8 is a system block diagram of a computer system that can be utilized to execute software of an embodiment of the present invention.

As discussed above, the system is preferably implemented in an FPGA or ASIC chip. However, other implementations may be used. For example, FIG. 8 shows a system block diagram of computer system 170 that may be used to execute software of an embodiment of the invention. The computer system 170 includes memory 172 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Computer system 170 further includes subsystems such as a central processor 171, fixed storage 174 (e.g., hard drive), removable storage 176 (e.g., CD-ROM drive), and one or more network interfaces 177. Other computer systems suitable for use with the invention may include additional or fewer subsystems. For example, computer system 170 may include more than one processor 171 (i.e., a multi-processor system) or a cache memory. The computer system 170 may also include a display, keyboard, and mouse (not shown) for use as a host.

The system bus architecture of computer system 170 is represented by arrows 178 in FIG. 8. However, these arrows are only illustrative of one possible interconnection scheme serving to link the subsystems. For example, a local bus may be utilized to connect the central processor 171 to the system memory 172. Computer system 170 shown in FIG. 8 is only one example of a computer system suitable for use with the invention. Other computer architectures having different configurations of subsystems may also be utilized. Communication between computers within the network is made possible with the use of communication protocols, which govern how computers exchange information over a network.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for multiprotocol encapsulation for transporting protocols over Ethernet, the method comprising:
   exchanging encapsulation control header information with a remote node;
   receiving frames from an optical interface and identifying a protocol of the frame, wherein said frames are multiprotocol;
   generating one or more encapsulation control headers;
   encapsulating said frames with said one or more encapsulation control headers; and
   transporting said frames over an Ethernet link;
   wherein generating said one or more encapsulation control headers comprises determining if a mode of operation is login or normal and said encapsulation control header comprises credit recovery fields for data recovery in said login mode of operation, and wherein said credit recovery fields are used for credit recovery with a remote node via an optical interface and with a Fibre channel port.

2. The method of claim 1 wherein encapsulating said frame comprises mapping said received frame on an Ethernet packet.

3. The method of claim 1 wherein said encapsulation control header comprises first and second encapsulation control headers.

4. The method of claim 3 wherein said first and second encapsulation control headers each include CRC (Cyclic Redundancy Check) fields.

5. The method of claim 1 wherein said encapsulation control header comprises information identifying protocol type being transported.

6. The method of claim 1 wherein said encapsulation control header comprises a pause timer for Ethernet flow control.

7. The method of claim 1 further comprising transmitting login parameters with said encapsulation control header.

8. The method of claim 1 wherein said encapsulation control header comprises information on frame length.

9. The method of claim 1 wherein said encapsulation control header comprises credit management information in said login mode.

10. The method of claim 1 wherein said encapsulation control header indicates the number of ordered sets sent in said normal mode of operation.

11. The method of claim 1 further comprising receiving an encapsulation control header time out.

12. The method of claim 11 further comprising transmitting an offline sequence to restart a link.

13. The method of claim 1 further comprising detecting a link failure upon receiving said encapsulation control header information from the remote node.

14. The method of claim 1 wherein the protocols of said received frames include storage network interface protocols.

15. The method of claim 1 wherein at least some of the received frames are Fibre Channel.

16. The method of claim 15 further comprising fragmenting Fibre Channel frames.

17. The method of claim 1 wherein at least some of the received frames are Enterprise System Connection (ESCON).

18. The method of claim 1 wherein at least some of the received frames are Infiniband.

19. The method of claim 1 wherein at least some of the received frames are SONET.

20. The method of claim 1 wherein encapsulating said frames comprises combining multiple client frames into one encapsulation frame.

21. The method of claim 1 wherein encapsulating said frames comprises separating a client frame into multiple encapsulation frames.

22. The method of claim 1 further comprising receiving a failure notification based on said exchange of encapsulation control header information and generating an offline sequence.

23. The method of claim 22 further comprising transmitting the offline sequence transparently to a remote client in said one or more encapsulation control headers.

24. A system for multiprotocol encapsulation for transporting different protocols over Ethernet, the system comprising:
    means for exchanging encapsulation control header information with a remote node;
    means for receiving frames from an optical interface and identifying a protocol of the frame, wherein said frames are multiprotocol;
    means for generating one or more encapsulation control headers;
    means for encapsulating said frames with said one or more encapsulation control headers; and
    means for transporting said frames over an Ethernet link;
    wherein means for generating said one or more encapsulation control headers comprises means for determining if a mode of operation is login or normal and said encapsulation control header comprises credit recovery fields for data recovery in said login mode of operation, and wherein said credit recovery fields are used for credit recovery with a remote node via an optical interface and with a Fibre channel port.

25. A computer program product for multiprotocol encapsulation for transporting different protocols over Ethernet, the product comprising:
    code that exchanges encapsulation control header information with a remote node;
    code that receives frames from an optical interface and identifies a protocol of the frame, wherein said frames are multiprotocol;
    code that generates one or more encapsulation control headers;
    code that encapsulates said frames with said one or more encapsulation control headers;
    code that transports said frames over an Ethernet link; and
    a computer-readable storage medium for storing said codes;
    wherein code that generates said one or more encapsulation control headers comprises code that determines if a mode of operation is login or normal and said encapsulation control header comprises credit recovery fields for data recovery in said login mode of operation, and wherein said credit recovery fields are used for credit recovery with a remote node via an optical interface and with a Fibre channel port.

26. The of system claim 24 wherein said encapsulation control header comprises information identifying protocol type being transported.

27. The system of claim 24 wherein said encapsulation control header comprises a pause timer for Ethernet flow control.

28. The system of claim 24 wherein at least some of the received frames are Fibre Channel.

29. The system of claim 24 wherein means for encapsulating said frames comprises means for combining multiple client frames into one encapsulation frame.

30. The system of claim 24 further comprising means for receiving a failure notification based on said exchange of encapsulation control header information and means for generating an offline sequence.

31. The of computer program product of claim 25 wherein said encapsulation control header comprises information identifying protocol type being transported.

32. The computer program product of claim 25 wherein said encapsulation control header comprises a pause timer for Ethernet flow control.

33. The computer program product of claim 25 further comprising code that transmits an offline sequence to restart a link.

34. The computer program product of claim 25 further comprising code that generates an offline sequence in response to a failure notification based on said exchange of encapsulation control header information.

* * * * *